(12) United States Patent
Brasch et al.

(10) Patent No.: US 10,313,262 B1
(45) Date of Patent: Jun. 4, 2019

(54) SYSTEM FOR MANAGEMENT OF CONTENT CHANGES AND DETECTION OF NOVELTY EFFECTS

(71) Applicant: Amazon Technologies, Inc., Seattle, WA (US)

(72) Inventors: Alexandra Juliet Brasch, Seattle, WA (US); Brent Russell Smith, Redmond, WA (US); Douglas R. Hains, Seattle, WA (US); Corry Lee-Boehm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 15/385,178

(22) Filed: Dec. 20, 2016

(51) Int. Cl.
 *G06F 15/173* (2006.01)
 *H04L 12/911* (2013.01)
 *H04L 29/08* (2006.01)
 *H04L 29/06* (2006.01)

(52) U.S. Cl.
 CPC .............. *H04L 47/70* (2013.01); *H04L 67/10* (2013.01); *H04L 67/36* (2013.01); *H04L 29/06482* (2013.01); *H04L 29/08675* (2013.01); *H04L 29/08756* (2013.01); *H04L 65/601* (2013.01); *H04L 67/22* (2013.01); *H04L 67/2823* (2013.01)

(58) Field of Classification Search
 CPC ..... H04L 67/22; H04L 67/2823; H04L 43/08; H04L 47/70; H04L 67/10; H04L 67/36; H04L 29/06482; H04L 29/08756; H04L 65/601; H04L 29/08675

USPC ................................. 709/203, 224, 226, 246
See application file for complete search history.

(56) References Cited

U.S. PATENT DOCUMENTS

| | | | | |
|---|---|---|---|---|
| 2009/0183084 | A1* | 7/2009 | Robertson | G06Q 10/06 715/744 |
| 2010/0293486 | A1* | 11/2010 | Baartse | H01M 4/04 715/763 |
| 2011/0161825 | A1* | 6/2011 | Tierney | G06F 11/3672 715/736 |
| 2012/0151329 | A1* | 6/2012 | Cordasco | G06F 11/3006 715/234 |
| 2017/0099342 | A1* | 4/2017 | Chien | H04L 67/06 |
| 2017/0169028 | A1* | 6/2017 | Sherman-Presser | G06F 16/24578 |

* cited by examiner

Primary Examiner — Liang Che A Wang
Assistant Examiner — Johnny B Aguiar
(74) Attorney, Agent, or Firm — Knobbe, Martens, Olson & Bear, LLP

(57) ABSTRACT

Systems are provided to analyze user behavior with respect to different versions of content, and to identify the behavioral effects that can be attributed to the differences between the versions of content. Systems can determine whether an observed difference in user interactions with different versions of content is caused by the specific changes that have been made to content (e.g., an actual improvement or other substantive change), or whether the observed difference in user interactions is caused by the mere fact that the versions of content are different (e.g., due to the novelty of seeing a different version of content for the first time, regardless of whether the difference is a substantive improvement). In some cases, the observed effect may be caused both by the novelty of the content being changed and by the substance of the changes.

20 Claims, 6 Drawing Sheets

SYSTEM FOR MANAGEMENT OF CONTENT CHANGES AND DETECTION OF NOVELTY EFFECTS

BACKGROUND

Computing devices and communication networks can be utilized to exchange content and other information. In a common application, one computing device (such as a server computing device) can provide content to another computing device (such as a client computing device). The content may be provided with the intent to cause or provoke an action by the other computing device or a user of the other computing device. The content may be sent as an email, a web page, an interstitial page, a content item to be displayed on a web page, or the like.

In some scenarios, particular users or computing devices can be selected to receive new or changed content, while other users or computing devices can be selected to receive existing or unchanged content. Differences in how the sets of users interact with the provided content can then be analyzed to determine what effect, if any, the new or changed content has in comparison with the existing or unchanged content. For example, a server computing device may select, from a universe of available users, a subset or "control set" of users. The server computing device may also select a "treatment set" from the universe of available users. The control set and treatment set can be selected ahead of time, or users can be added to the respective subsets in response to requests for content. Content provided to users in the treatment set may be new, changed, or otherwise different versions of content provided to users in the control set. Responses or other user interactions with the provided content can be analyzed to determine whether the content provided to the treatment set users has provoked or otherwise resulted in different actions than the content provided to the control set users.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
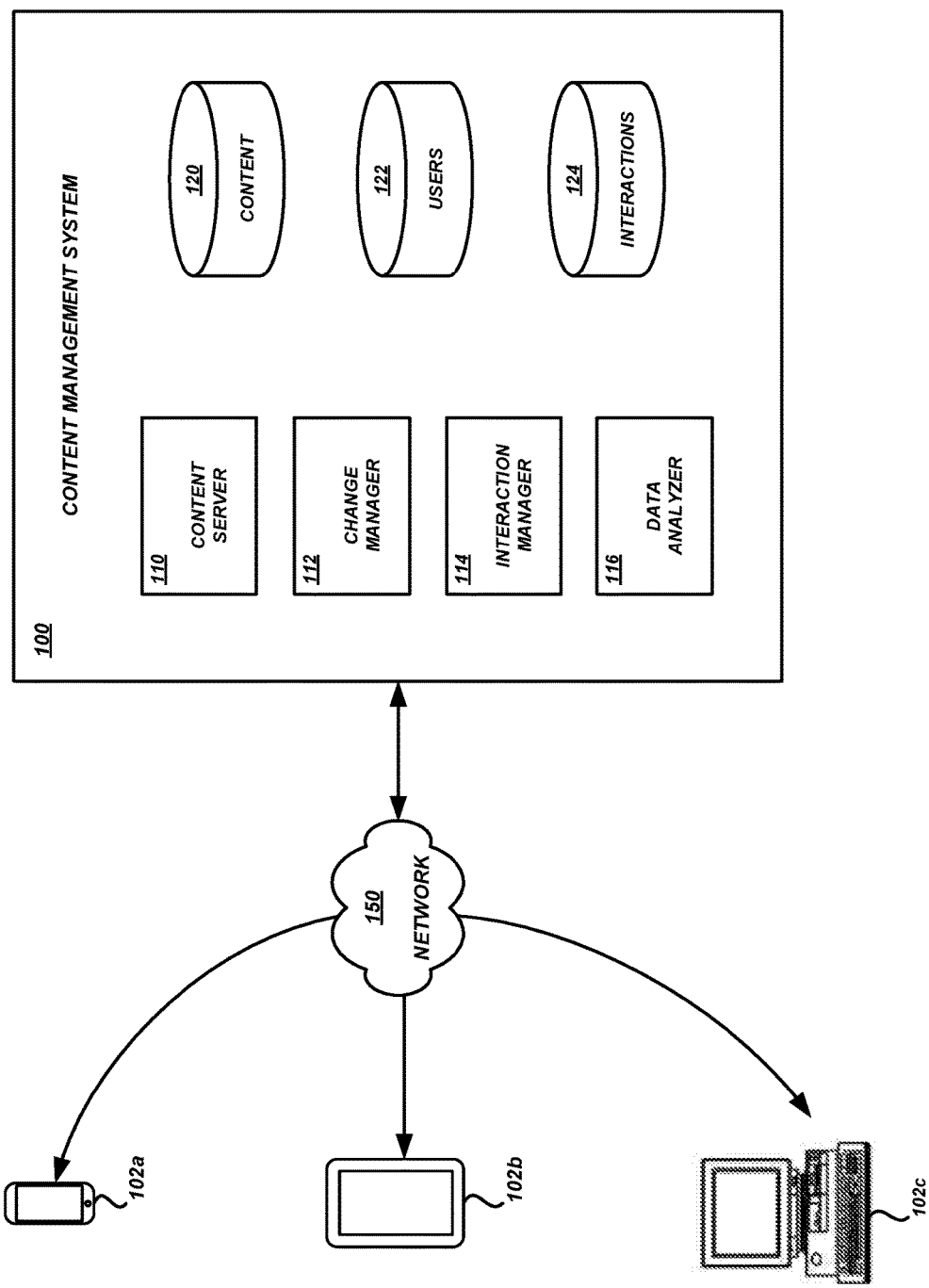
FIG. 1 is a block diagram of an illustrative computing environment including a content management system and various user devices according to some embodiments.

The present disclosure is directed to a system that analyzes user behavior with respect to different versions of content. The system identifies the behavioral effects, if any, that can be attributed to the differences between the versions of content. More specifically, the present disclosure is directed to determining whether an observed difference in user interactions with different versions of content is caused by the specific changes that have been made to content (e.g., an actual improvement or other substantive change), or whether the observed difference in user interactions is caused by the mere fact that the versions of content are different (e.g., due to the novelty of seeing a different version of content for the first time, regardless of whether the difference is a substantive improvement or degradation). If the difference in user interactions (the "observed effect") is likely caused by the specific changes made from one version of content to another, then the observed effect may persist to at least some degree. If the observed effect is likely caused by the novelty of the changes, then the observed effect may be only temporary (e.g., until the novelty wears off, until users learn that the changes are actually not substantive improvements or degradations over the previous version, etc.). In some cases, the observed effect may be caused both by the novelty of the content being changed and by the substance of the changes. The system can determine the degree to which the observed effect is caused by each of these factors, and then determine whether to retain the changes, make similar changes, discard the changes, or the like.

Some conventional systems determine the effect of changes to content by aggregating interaction data over the course of a period of time, and then extrapolating the observed effect of the changes into the future. For example, a particular network resource, such as a web page, may be modified to provoke some action by users. Illustratively, the modification may come from the use of a different algorithm to generate recommendations of items for sale: the original version of the network resource may include recommendations generated using one algorithm, while the modified version of the network resource may include recommendations generated using a different algorithm. The desired action to be provoked may be an increase in sales. A system may provide the modified version of the network resource to a particular group of users (the "treatment set"), and provide the unmodified version of the network resource to a different group of users (the "control set"). The system can then monitor the users' interactions (e.g., number of purchases or total sales amount) with each version of the network resource over a period of time. The system can compare the monitored interactions between the treatment set and control set to determine the effect of the change. In a typical scenario, there may be an immediate effect on the monitored interactions (e.g., the treatment set users may spend an average of $0.10 more than the control set users during the first day). After the change, there may continue to be a difference in the monitored interactions. One way to explain the ongoing difference in interactions is that the users in the treatment set are re-exposed to the modified network resource. For example, if the recommendations generated using the new algorithm cause users to spend an average of $0.10 more each time they are exposed to the changed network resource, then the users would end up spending an average of $0.20 more if exposed to the changed network resource twice. However, this conventional analysis fails to capture or explain cases where users' interactions differ over the course of multiple exposures in a period or unit of time (e.g., where the observed effect is non-linear or non-cumulative, or where the observed effect otherwise differs from the effect that would otherwise be expected based on the first exposure to the change). Systems that use these conventional methods of determining the effect of changes may incorrectly estimate the long term effect of such changes.

Aspects of the present disclosure relate to determining the degree to which changes in content cause changes in user interactions over the course of multiple exposures to the changed content and/or over the course of multiple or extended periods of time. This determination is in contrast to conventional systems, such as those described above, that simply estimate future user interactions by assuming that any effects observed after a first exposure to changed content and/or after a first period of time will continue in the future. Illustratively, systems can collect data regarding user interactions with first and second content items that differ in some way. In some embodiments, the first and second content items correspond to original versions of content items and modified version of the content items, respectively. User exposures to changed content may be referred to as "trigger events" or "triggers." The system can align the data regarding user interactions according to the time of the first trigger event. For example, one user may have a first trigger event at 12:00 PM on May 1, 2016, while another user may have a first trigger event at 5:00 PM on May 5, 2016. Subsequent user interactions and trigger events for each of these users may be defined in terms of an amount of time elapsed since the respective user's first trigger event. In this way, the interactions and trigger events of different users can be directly compared, aggregated, or otherwise analyzed regardless of when each user's first trigger event occurred. In addition to analyzing and comparing effects observed for such users (e.g., the "treatment set"), the system can analyze and compare effects observed in the interactions of treatment set users and control set users. In doing so, the effects attributable to the changes in content can be identified (assuming the treatment set and control set are appropriately selected). Moreover, the effects actually attributed to the changed content can be compared to the expected effects (e.g., as estimated based on extending the effects observed after the first content trigger). In this way the system can determine whether the effects are likely to be due to the novelty of the change rather than a substantive improvement (or degradation) caused by the change.

Although aspects of some embodiments described in the disclosure will focus, for the purpose of illustration, on particular examples of content, changes to content, and user interactions with the content, the examples are illustrative only and are not intended to be limiting. In some embodiments, the systems and techniques described herein may be applied to other types of content, changes to content, user interactions, or the like. For example, although the disclosure focuses on specific examples dealing with differences between different versions of web pages, other network resources may be used instead of web pages (e.g., images, videos, animations, audio recordings or streams, applications, documents, files, etc.). Various aspects of the disclosure will now be described with regard to certain examples and embodiments, which are intended to illustrate but not limit the disclosure.

Network-Based Interaction Analysis Environment

With reference to an illustrative embodiment, FIG. 1 shows a network environment in which aspects of the present disclosure may be implemented. As shown, the network environment may include a content management system 100 and various user devices 102a, 102b, and 102c (collectively "user devices 102"). The user devices 102 and content management system 100 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or a combination thereof, some or all of which may or may not have access to and/or from the Internet.

The content management system 100 may include various components for providing the features described herein. Illustratively, the content management system 100 may include a content server 110 configured to provide content in response to requests from user device 102. The content management system 100 may also include a change manager 112 configured to manage the implementation of changes to content, selection of which users get changed content or unchanged content (or, more generally, first content or second content), etc. The content management system 100 may also include an interaction manager 114 (or multiple interaction managers 114) configured to manage user interactions with the changed and unchanged content, store data regarding the interactions for analysis, etc. In some embodiments, different interaction managers 114 may be used to manage different types of interactions. For example, one interaction manager 114 may manage "clicks" or other graphic user interface interactions, while a separate interaction manager 114 may manage purchases and/or other transactions. The content management system 100 may also include a data analyzer configured to identify the effects (if any) of changes to content, and determine the likely causes of the identified effects.

The content management system 100 may also include various data stores to store content and/or data in connection with the operations of the content management system 100. For example, the content management system 100 may include a content data store 120 to store the content (or data regarding the content) available to the user devices 102. The content management system 100 may also include a users data store 122 to store data about the users to whom content (both changed and unchanged) has been or may be provided. The content management system 100 may also include an interaction data store 124 to store data regarding the user interactions with content (both changed and unchanged). The data stores and other components of the content management system 100 shown in FIG. 1 and described herein are illustrative only, and are not intended to be limiting. In some embodiments, fewer, additional, and/or alternative data stores and/or components may be implemented by a content management system 100.

The content management system 100 may be implemented on one or more physical server computing devices that provide computing services and resources. In some embodiments, the content management system 100 (or individual components thereof, such as the content server 110, change manager 112, interaction manager 114, data analyzer 116, various data stores, etc.) may be implemented on one or more host devices, such as blade servers, midrange computing devices, mainframe computers, desktop computers, or any other computing device configured to provide computing services and resources. For example, a single host device may execute one or content servers 110, change managers 112, interaction managers 114, data analyzers 116, data stores 120, 122, and/or 124, some combination thereof, etc. The content management system 100 may include any number of such hosts.

In some embodiments, the features and services provided by the content management system 100 may be implemented as web services consumable via the communication network 150. In further embodiments, the content management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

The individual user devices 102 may be any of a wide variety of computing devices, including personal computing devices, terminal computing devices, laptop computing devices, tablet computing devices, electronic reader devices, wearable computing devices, mobile devices (e.g., smart phones, media players, handheld gaming devices, etc.), and various other electronic devices and appliances. A user may operate a user device 102 to access and interact with content provided by the content management system 100 and/or to perform other computing tasks. In some embodiments, a user may launch specialized application software, such as a mobile application, or general application software, such as a browser application, to interact with the content provided by the content management system 100 and/or to perform other computing tasks.

Example Process for Analyzing Interaction Data

Figure 2:
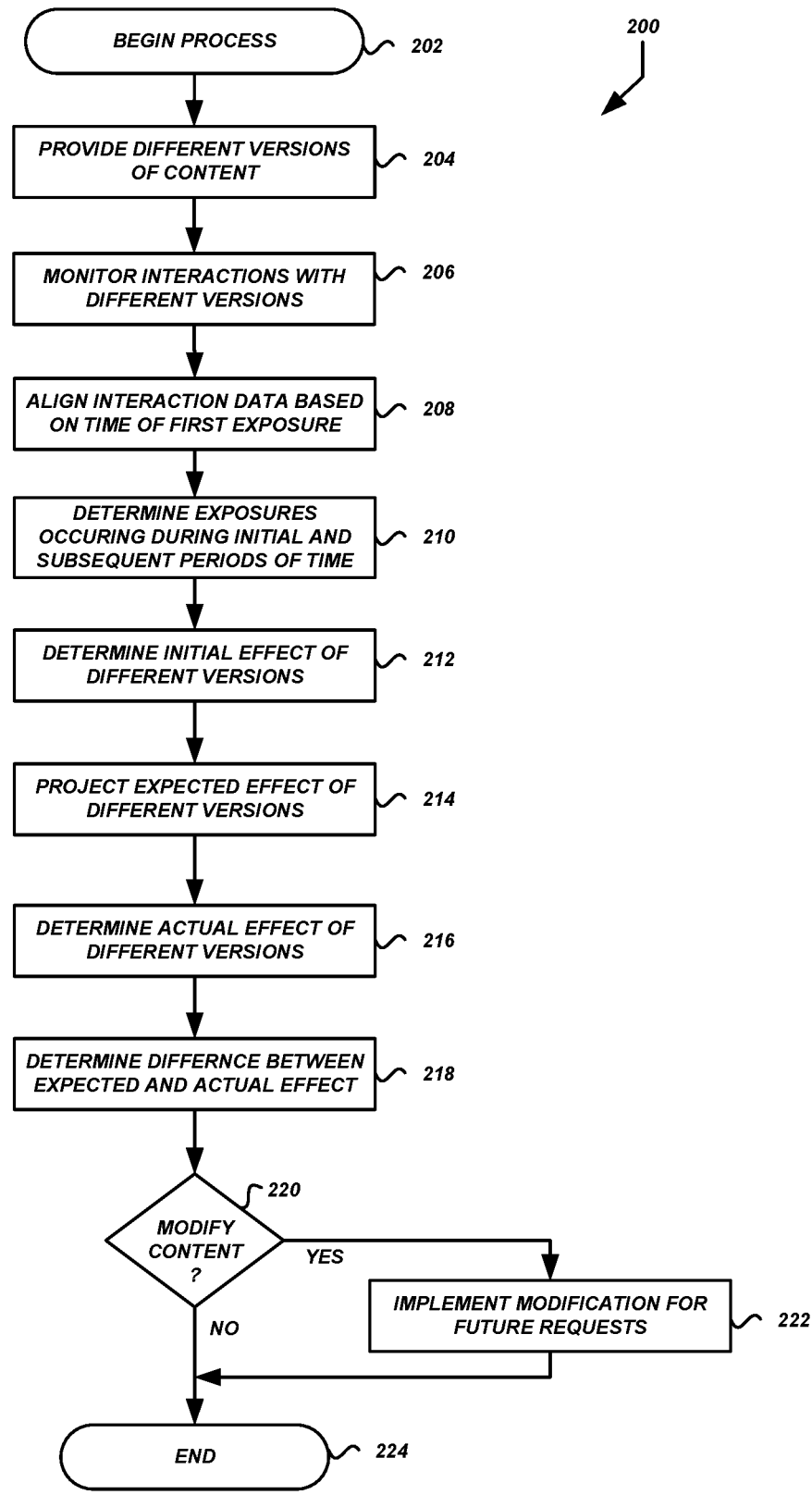
FIG. 2 is a flow diagram of an illustrative process for analyzing content interactions and determining novelty effects of changes to content according to some embodiments.

FIG. 2 is a flow diagram of an illustrative process 200 that may be executed by a content management system 100 to serve different versions of content and analyze interactions with the different version of the content. The process 200 will be described with reference to the example interactions between user devices and the content management system shown in FIG. 3, the example versions of content shown in FIGS. 4A and 4B, and the example diagrams of expected and observed effects shown in FIGS. 5A and 5B. As shown and described in greater detail below, a change manager 112 may determine which versions of content the content server 110 is to serve to any given user device 102, and an interaction manager 114 can process interactions with the content. Advantageously, a data analyzer 116 can analyze the interactions to determine whether the differences between the versions of the served content have affected the user interactions with the content and, if so, the extent to which the effects may be due to the substantive changes or are instead due to the novelty of changed content.

The process 200 shown in FIG. 2 begins at block 202. The process 200 may begin in response to an event, such as when execution of a content server 110 or change manager 112 begins, when initiated by a system administrator, etc. When the process 200 is initiated, a set of executable program instructions stored on one or more non-transitory computer-readable media (e.g., hard drive, flash memory, removable media, etc.) may be loaded into memory (e.g., random access memory or "RAM") of a computing device of the content management system 100, such as the computing device 600 shown in FIG. 6. The executable instructions may then be executed by a hardware-based computer processor (e.g., a central processing unit or "CPU") of the computing device. In some embodiments, the process 200 or portions thereof may be implemented on multiple processors, serially or in parallel.

At block 204, the content server 110, change manager 112, and/or some other module or component of the content management system 100 can provide different versions of content to different user devices 102. For example, a network resource hosted by or otherwise provided by the content management system 100 may be a particular web page, such as a home page of a retail shopping site. The web page may include a recommendations portion showing items that may be of particular interest to the user based on the user's past browsing and/or purchase history, demographic information, etc. The operator of the content management system 100 may have developed a new way to generate recommendations for display in the recommendations portion. In order to test the effectiveness of the new recommendation algorithm in comparison with the existing recommendation algorithm, the content management system 100 may provide recommendations generated using the existing algorithm to some users, and recommendations generated using the new algorithm to other users. In this example, the users receiving recommendations generated using the existing algorithm may be referred to as the control set, and the users receiving the recommendations generated using the new algorithm may be referred to as the treatment set.

Figure 3:
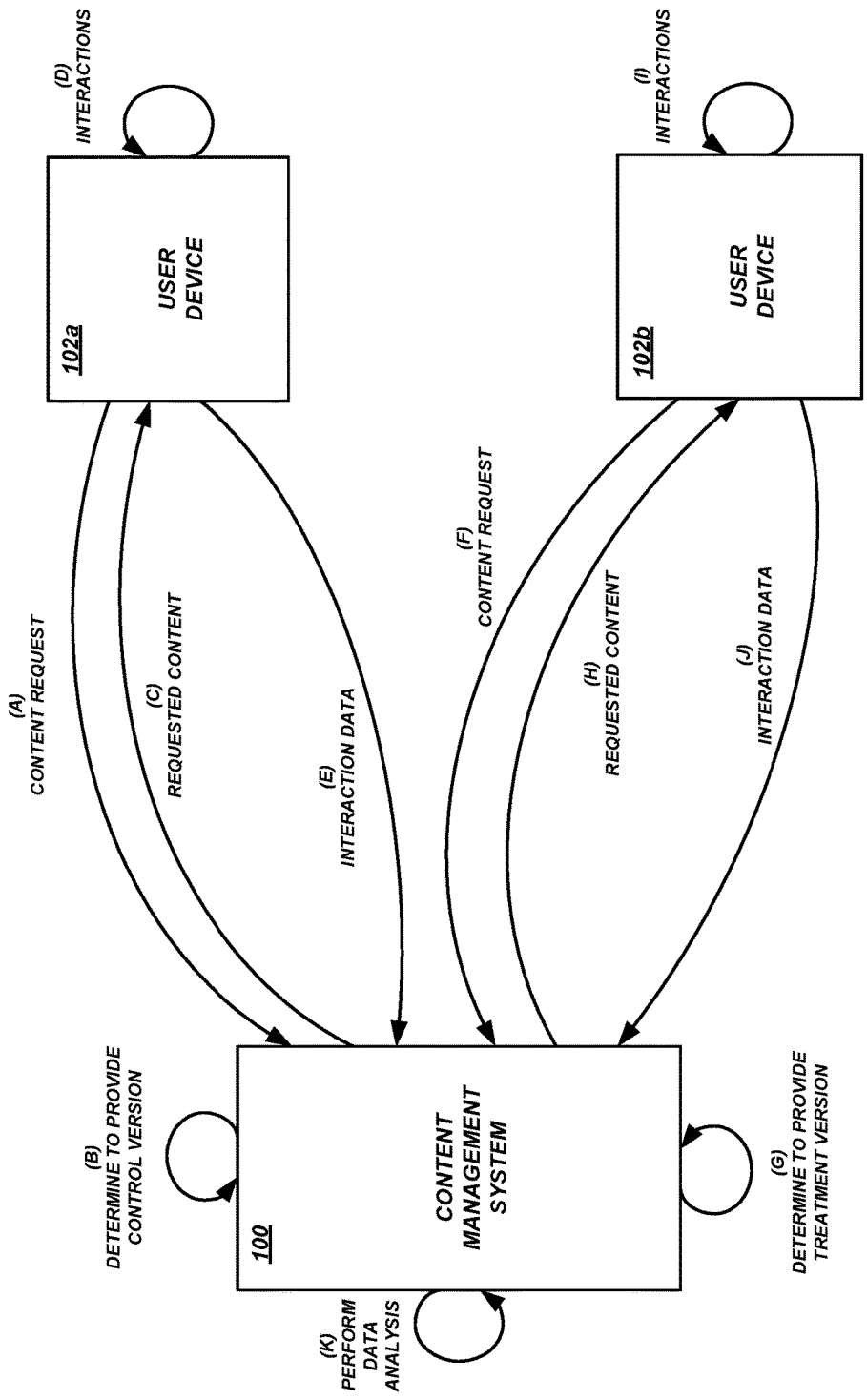
FIG. 3 is a block diagram of illustrative interactions and data flows between client devices and a content management system according to some embodiments.

FIG. 3 shows an example of the data flows and interactions between user devices 102a, 102b and the content management system 100 during testing of a change to content. As shown, a first user device 102a may request a network resource from the content management system 100 at (A). In this example, the requested network resource may be a web page with recommendations, as described above. The change manager 112 may determine whether the requested network resource should be generated using the existing recommendation algorithm or the new recommendation algorithm. For example, the user of the requesting user device 102a may be pre-assigned to one of the groups, the user may be dynamically assigned at the time of the request based on profile information associated with the user, the user may be randomly assigned to a group at the time of the request, etc. As shown, the change manager 112 may determine at (B) that for the request received at (A), the response should be generated using the existing algorithm. The content server 110 may then provide the requested network resource, with recommendations generated using the existing recommendation algorithm, to user device 102a at (C).

A second user device 102b may request the same network resource (or a related network resource) at (G). The change manager 112 may determine whether the requested network resource should be generated using the existing algorithm or the new algorithm for this request. Illustratively, the change manager 112 may determine at (H) that for the request received at (G), the response should be generated using the new algorithm. The content server 110 may then provide the requested network resource, with recommendations generated using the new recommendation algorithm, to user device 102b at (I). Although FIG. 2 shows only two user devices requesting and receiving content from the content management system 100, there may be many more user devices participating in the test. For example, there may be dozens, hundreds, thousands, or millions of different user devices requesting the content page, being assigned to groups, and receiving content generated with either the existing algorithm or the new algorithm.

Figure 4A:
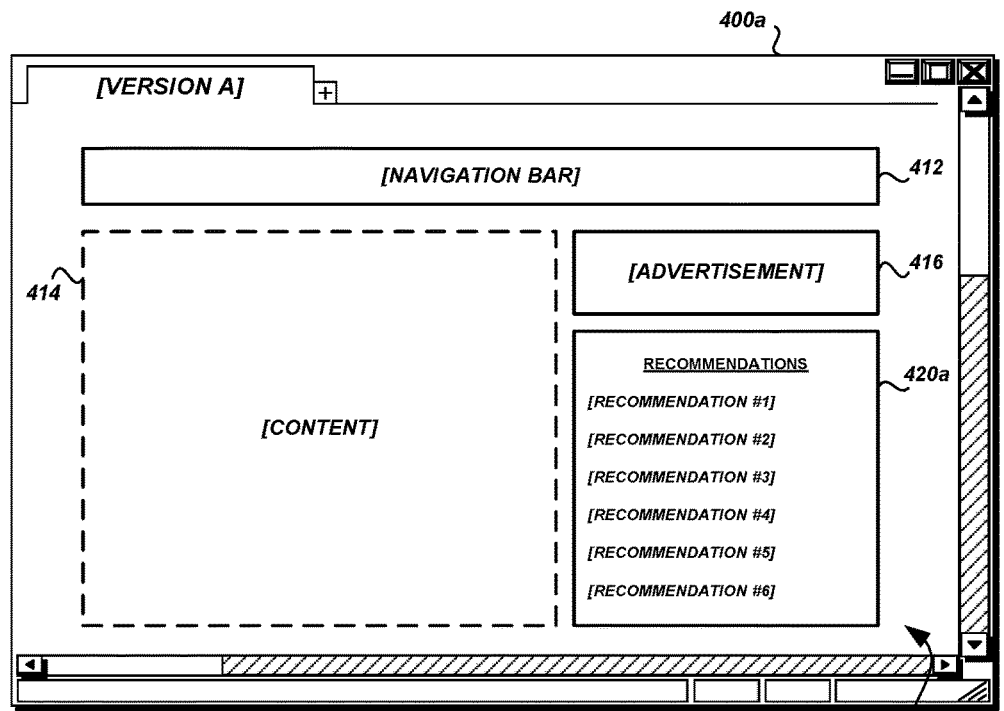
FIGS. 4A and 4B are conceptual diagrams of original content and changed content according to some embodiments.
Figure 4B:
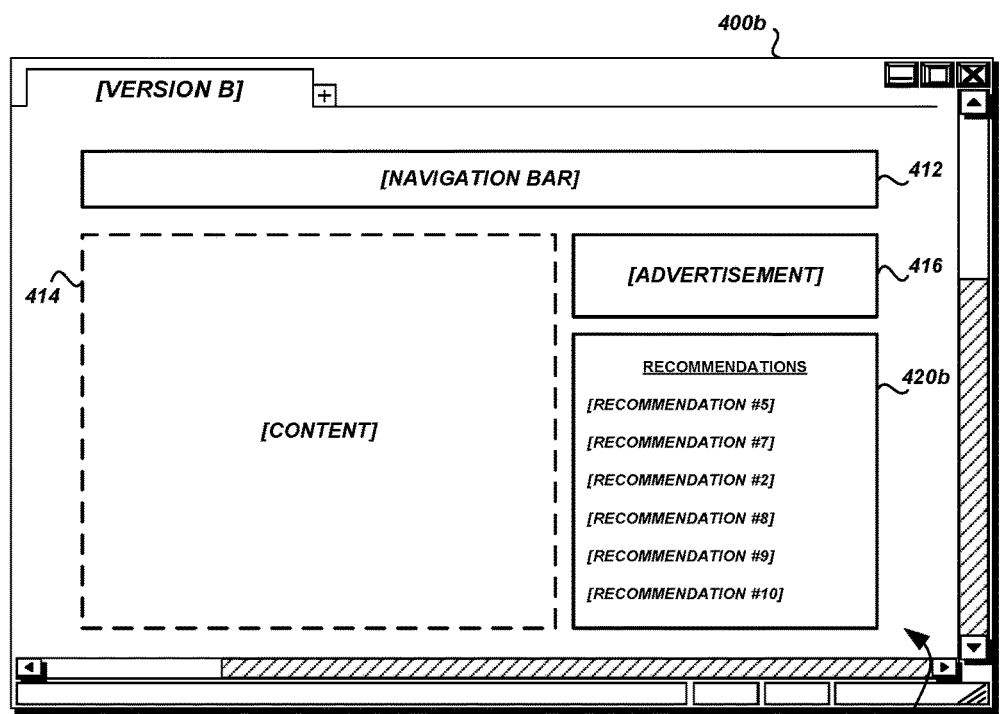

FIGS. 4A and 4B show examples of different versions of content provided to different user devices during a test, such as the test described above. The network resource 410a shown in the user interface 400a of FIG. 4A may correspond to a version of the network resource provided to user device 102a. As shown, the network resource 410a may include various visual elements, some or all of which may be interactive. For example, the network resource 410a may include a navigation bar 412 providing various options, such as menu options, hyperlinks, action buttons, and the like. The network resource 410a may also include a listing 414, such as a listing of content that may be accessed, a listing of items available for sale, a listing of search results, or the like. The network resource 410a may also include a banner advertisement 416. In addition, the network resource 410a may include a recommendations region 420a. The items shown in the recommendations region 420a may be selected using the existing recommendations algorithm, as described above.

The network resource 410b shown in the user interface 400b of FIG. 4B may correspond to a version of the network resource provided to user device 102b. As shown, the network resource 410b may include the same visual elements as the network resource 410a provided to user device 102a. For example, the network resource 410b may include a navigation bar 412, a listing 414, and a banner advertisement 416. The network resource 410b may also include a recommendations region 420b. The items shown in the recommendations region 420b may be selected using the new recommendations algorithm instead of the existing recommendations algorithm, as described above.

Although the example described herein and shown in FIGS. 4A and 4B focuses on the recommendations regions 420a and 420b being the only difference or primary difference between the network resources 410a and 410b, the example is illustratively only and is not intended to be limiting. In some embodiments, additional and/or alternative differences between the network resources 410a and 410b may be implemented and their effects on user interactions may be tested. For example, a different navigation bar may be provided with the respective pages, and the effects of the different navigation bars on certain monitored user interactions may be analyzed. As another example, the location or visual appearance of various visual elements may be altered while the substance or content of the visual elements remains the same. This can facilitate determining the effects of those differences on usage of the visual elements, and/or the effects on user interactions as a whole. In some embodiments, multiple differences or treatments may be tested concurrently. For example, two or more new algorithms for generating recommendations may both be tested. Each treatment or change (in this example, each new or changed recommendation algorithm) may be analyzed in a pairwise manner in comparison with the control (in this example, the existing recommendation algorithm). Each treatment may also or alternatively be analyzed with respect to each other treatment, or some subset thereof.

Returning to FIG. 2, at block 206 the interaction manager 114 or some other module or component of the content management system 100 can monitor interactions with the content provided to the user devices above at block 204. In the present example, users may click on various elements of the requested network resource, view additional product information, purchase items, and the like. As shown in FIG. 3, user interaction information regarding interactions (D) with content displayed on user device 102a can be provided to the content management system 100 at (E). For example, user activation of hyperlinks or other interactive components of the recommendations region 420a may cause requests or other data to be transmitted to the content management system 100. As another example, purchases or other use of the network resource may be monitored, even if such interactions do not directly involve interaction with the recommendations region 420a. In a similar manner, user interaction information regarding interactions (J) with content displayed on device 102b can be provided to the content management system 100 at (K). The content management system 100 can analyze the interaction data at (L), as described in greater detail below, to determine the effects of the differences between the network resources on user interactions, and the likely causes of the observed effects.

At block 208, the data analyzer 116 or some other module or component of the content management system 100 can begin analyzing the interaction data by "aligning" the data regarding individual user interactions to the time that the user was first exposed to the test. For example, when aligning the data for a particular user (a "first user"), each individual interaction may be tagged with an amount of time elapsed since the first exposure of the first user to the test. One interaction may have been selection of a recommendation in the recommendations region 420a about five seconds after being provided with the network resource 410a for the first time during the test. This interaction may therefore be tagged or otherwise associated with a time of five seconds from initial exposure. Another interaction may have been the purchase of a product about ten minutes after first being provided with the network resource 410a during the test. This interaction may therefore be tagged or otherwise associated with a time of ten minutes from initial exposure. Other interactions of the user may be similarly tagged, even if the interactions occur hours or days later. Interactions of a different user (a "second user") may also be tagged in a similar manner. However, the second user's interactions may be tagged with an amount of time elapsed since the second user was first exposed to the test, rather than the time elapsed since the first user was first exposed to the test. In this way, the interactions from different users may be compared, aggregated, and otherwise analyzed based on the amounts of time elapsed since the first exposure of the respective user to the test. Thus, interaction data regarding interactions of the first user, first exposed to the test on May 1, 2016 at 12:00 PM, may be compared to, aggregated with, or otherwise analyzed with data regarding interactions of the second user who was first exposed to the test on May 5, 2016 at 5:00 PM.

At block 210, the data analyzer 116 or some other module or component of the content management system 100 can determine a number of exposures or "trigger events" experienced by individual users over one or more periods or units of time following an initial exposure to the test. For example, a period of time for a particular test may be defined as a certain number of seconds, minutes, hours, or days. The data analyzer 116 can use the "aligned" data, described above, to determine the number of exposures to the content change being tested for each period of time following the initial exposure. The determination may be a sum or count per user, an aggregate sum or count for all users, etc. In some embodiments, users may be grouped based on their respective numbers of exposures. The number of exposures to the test can affect the interactions of the users. For example, one user accesses network resource 410b five times in a day, while another user may access the network resource 410b only twice in a week. When comparing the effect of exposure on these users, it may be misleading to determine the effects over the course of a week after first being exposed to the test because the first user was exposed so many more times than the second user. Instead, a more accurate picture may be obtained by grouping users based on the rate or number of times that they were exposed, or by comparing the rate of increase in certain interactions per exposure.

At block 212, the data analyzer 116 or some other module or component of the content management system 100 can determine the initial effect, if any, of the change to the network resource or difference in versions of the network resource. In some embodiments, the initial effect may be determined as a measurement of a particular interaction metric over a particular period of time following a user's first exposure to the test. Returning to the example above, the metric to be analyzed may be the change in sales after exposure to recommendations generated using the new recommendation algorithm. In determining the initial effect of exposure to recommendations generated using the new recommendation algorithm, the data analyzer 116 may compute the average sales (e.g., sales per user) within 24 hours of first exposure by users in the treatment set to the new recommendation algorithm. In this example, the period of time, for both the initial period and subsequent periods, may be defined as 24 hours (however, in other examples, other periods of time may be used, as described above). The computed average may then be compared to the average sales of the control set within 24 hours of first exposure by users in the control set to the existing recommendation algorithm. The difference in the two averages can be identified as the initial effect of the new recommendation algorithm.

At block 214, the data analyzer 116 or some other module or component of the content management system 100 can determine the expected effect over one or more periods of time following the period within which the initial effect was determined. In some embodiments, the expected effect may be based on assuming that the initial effect will continue to be observed for each subsequent exposure to the change. In the present example, the expected effect may be computed by determining the number and distribution of exposures to the change over one or more subsequent periods of time, and applying the initial effect to the exposures in each of the subsequent periods of time. Such an estimate of the expected effect, if graphed, may take the form of a curve or line that extends generally in the direction established by the initial effect. Illustratively, the expected effect for any particular subsequent period of time may be determined by multiplying the observed initial effect per exposure, as determined above at block 212, by the number of exposures in the subsequent period of time, as determined above at block 210. If the metric being evaluated is the change in sales caused by each exposure, and the initial effect determined above is that a particular change causes users to spend an average of $0.10 more each time they are exposed to the change, then users who were exposed twice in a subsequent period of time would be expected to spend an average of $0.20 more during the subsequent period of time.

At block 216, the data analyzer 116 or some other module or component of the content management system 100 can determine the observed effect (also referred to as the "actual effect") over a period of time following the period within which the initial effect was determined. In some embodiments, the observed effect may be determined by computing the difference in the occurrence of a certain desired action, such as purchases, by users in the control set in comparison with users in the treatment set. In the present example, the actual or observed effect may be computed by determining the number and distribution of actual differences between treatment set and control set performance of a desired action after additional exposures or over the course of certain periods of time. Such a computation, if graphed, may take the form of a curve or line that connects or substantially traces points representing actual data points.

Figure 5A:
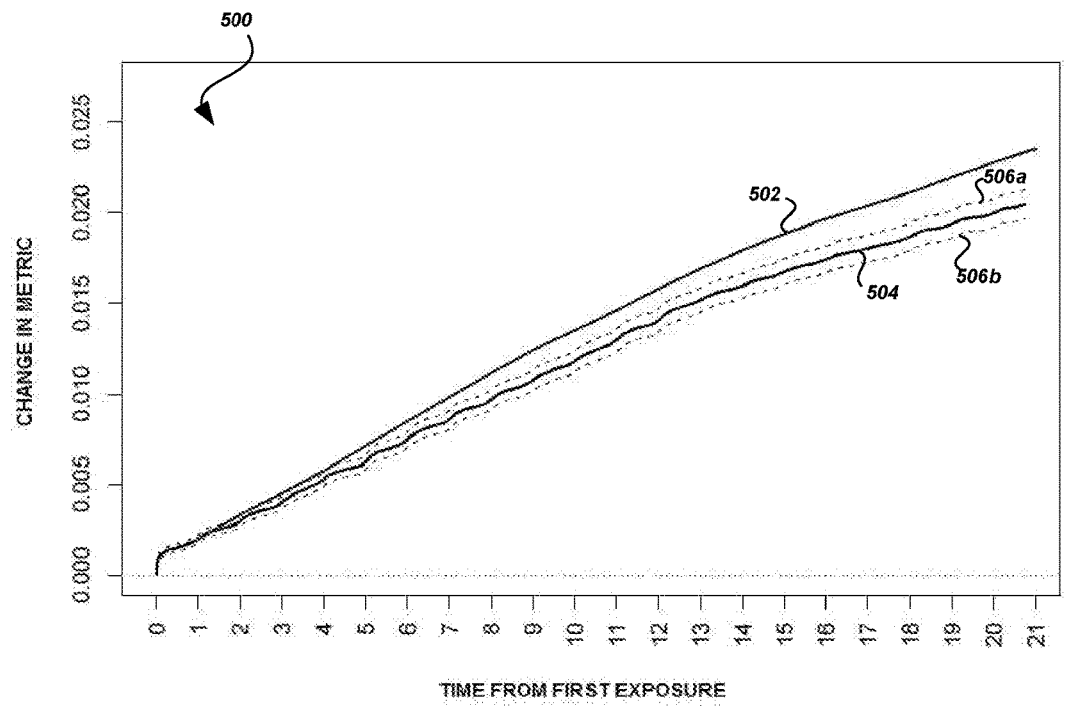
FIGS. 5A and 5B are graphs of illustrative analyses of content interactions according to some embodiments.
Figure 5B:
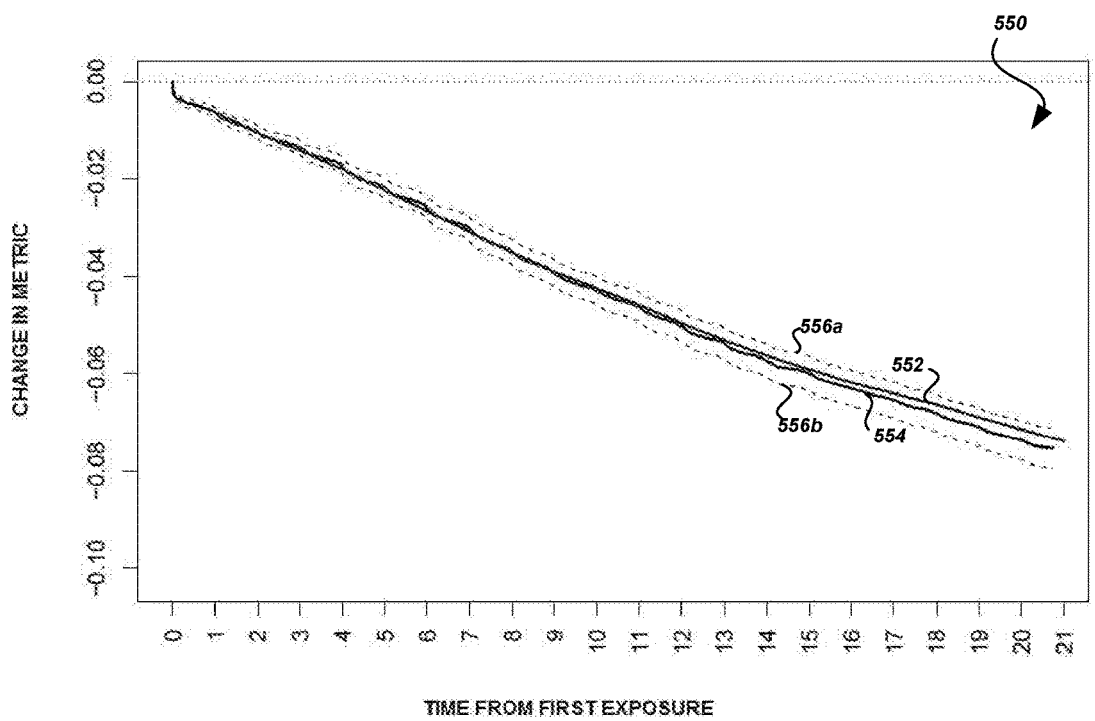

At block 218, the data analyzer 116 or some other module or component of the content management system 100 can determine the difference between the expected effect and the observed effect. In some embodiments, the difference between the expected effect and observed effect may be a simple mathematical difference computed by subtracting a value representative of the expected effect from a value representative of the observed effect, or vice versa. FIGS. 5A and 5B show example graphs of the initial effect, expected effect, and observed effect of exposure to changes or different versions of content. From these example graphs, the difference between the expected effect and the observed effect can be seen.

FIG. 5A is an example graph 500 of effects that correspond to an increase in a particular metric over a period of time. As shown, on the date of first exposure to the content being tested (the date of the first "trigger" event), the metric represented on the y-axis increases. Illustratively, the metric may be the difference in the occurrence of a certain desired action, such as purchases, by users exposed to a new version of content in comparison with users exposed an existing version of the content. In the graph 500, curve 502 is the curve of the expected effect over the course of time, curve 504 is the curve of the observed effect over the course of time, and curves 506a and 506b represent the margin of error in the observed effect. As shown, the metric in the example modeled by graph 500 has increased over the course of time. However, the increase has not kept pace with the expected increase, as shown by the curve 502 of the expected increase being above (representing greater values) the curve 504 as time progresses, and also being generally outside the margin of error 506a, 506b of the observed effect. This example may indicate that the observed increase in the metric is at least partially due to the novelty effects of the content. Alternatively or in addition, the variance of the observed effect curve 504 from the expected effect curve 502 may be indicative of users "learning" not to perform an action (e.g., users determining, after being exposed to the changed content, that performing the action is not desirable).

FIG. 5B is an example graph 550 of effects that correspond to a decrease in a particular metric over a period of time. As shown, on the date of first exposure to the content being tested (the date of the first "trigger" event), the metric represented on the y-axis decreases. Illustratively, the metric may be the difference in the occurrence of a certain desired action, such as purchases, by users exposed to a new version of content in comparison with users exposed an existing version of the content. In the graph 550, curve 552 is the curve of the expected effect over the course of time, curve 554 is the curve of the observed effect over the course of time, and curves 556a and 556b represent the margin of error in the observed effect. As shown, the metric in the example modeled by graph 550 has decreased over the course of time. In addition, the decrease is closely correlated with the expected effects, as shown by the expected effects curve 552 being within the margin of error 556a and 556b of the observed effect curve 552. This example may indicate that the observed decrease in the metric is due to the substance or merits of the change in the content, rather than being due to the novelty effects of the content.

Returning to FIG. 2, at decision block 220 the content management system 100 can determine whether to implement the tested change. The determination may be based on a single factor (e.g., the observed change in a particular metric), or based on a combination of factors (e.g., the cost to implement the change in comparison with the potential profits from large-scale realization of the observed effect). In the present example, the content management system 100 can determine whether to implement the new recommendations algorithm or keep the existing recommendations algorithm. If the graph 500 in FIG. 5A is representative of the observed effect, then the content management system 100 may determine whether the observed effect, which is trending away from the expected change and appears to be plateauing, will provide enough benefit to outweigh the costs of implementing the new algorithm. If the graph 550 in FIG. 5B is representative of the observed effect, then the content management system 100 may simply determine not to proceed with the change due to the negative observed effect on a particular metric.

In some embodiments, two or more metrics may be analyzed. For example, an operator of the content management system 100 may wish to determine how much additional advertising revenue may be realized by a change to a banner advertisement. In order to determine whether to implement the change, the operator may also wish to determine how the banner advertisements affects metrics associated with other portions of a network resource on which the banner advertisement is displayed. In this example, the graph 500 in FIG. 5A may be representative of the expected and observed effects on advertising revenue from implementing the change to the banner advertisement. The graph 550 in FIG. 5B may be representative of the expected and observed effects on sales attributable to another portion (e.g., the recommendations region) of the network resource on which the banner advertisement is displayed. In this case, it appears that the increase in advertising revenue may not be as strong as expected, and may actually be plateauing or eventually decreasing as the novelty of the new banner ad wears off or as users "learn" not to interact with or the banner advertisement. In addition, it appears that the banner advertisement is having a negative impact on the effectiveness of the recommendations region to drive sales, and this negative impact appears to be in line with estimates and is not abating. In this scenario, the content management system 100 or operator thereof may further determine whether the short term increase in advertising revenue is enough to offset the costs of implementing the change, and the apparent persistent reduction in effectiveness of the recommendations region. If the content management system 100 determines to implement the tested change, the process 200 may proceed to block 222 where the change is implemented. Otherwise, if the change is not to be implemented, the process 200 may terminate at block 224.

Figure 6:
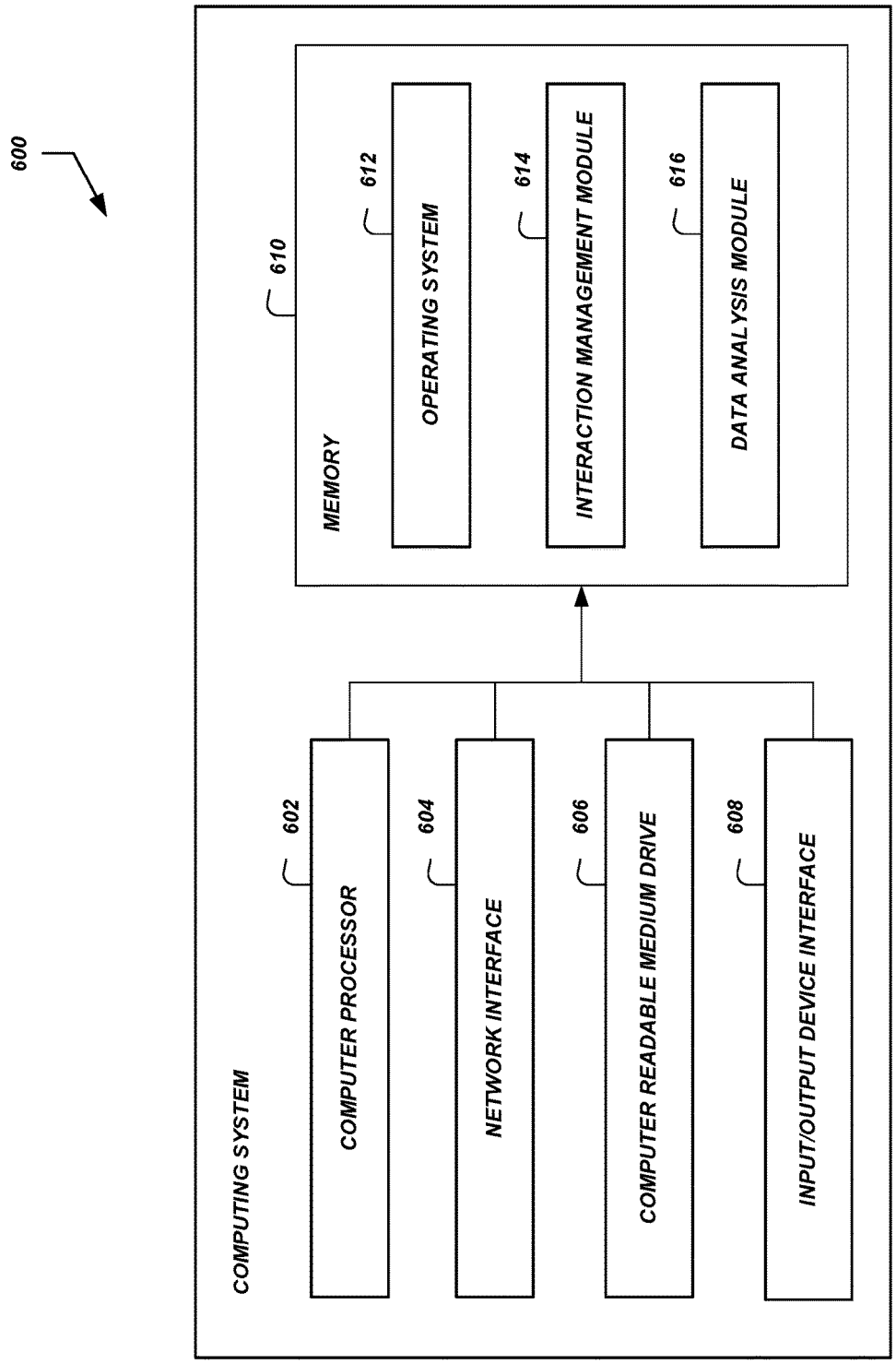
FIG. 6 is a block diagram of an illustrative computing device configured to analyze interaction data and determine novelty effects of changes to content according to some embodiments.

Although the process 200 is described above with respect to the network resource being a web page, in some embodiments the network resource may be any other network-accessible content, including audible content, visual content, or tactile content. For example, a network resource may be an audio presentation that is presented by user devices via speakers. Differences in versions of audio presentations may be different words or spoken content, different voices, different rates of playback, and the like. Interactions with or associated with audio presentations may include user utterances, purchases, other transactions, and the like. As another example, a network resource may be a video presentation such as a movie or television show that is presented by user devices via display screens. Differences in versions of video presentations may be different scenes or effects, different colors or images, and the like. Interactions with or associated with video presentations may include playback operations, save operations, purchases, other transactions, and the like. As a further example, a network resource may include data for implementing a tactile presentation, such as a braille presentation. Differences in versions of tactile presentations may be different words or content, different tactile effects or properties, and the like. Interactions with or associated with tactile presentations may include reading operations, purchases, other transactions, and the like Execution Environment FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface; and one or more computer readable memories 610, such as random access memory ("RAM") and/or other volatile non-transitory computer-readable media.

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure. For example, in one embodiment, the computer-readable memory 610 may include a data analyzer module 514 that implements the data analyzer 116 and performs the process 200 described above (or portions thereof).

In some embodiments, multiple computing systems 600 may communicate with each other via their respective network interfaces 604, and can implement the features described herein serially, asynchronously, in parallel, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   as performed by a computing system configured to execute specific instructions,
      determining an initial effect that a difference between a first version of a network resource and a second version of the network resource has on a metric during an initial period of time, wherein the metric relates to actions performed after accessing the network resource, and wherein the difference comprises at least one of: a portion of the first version is generated using a different algorithm than a corresponding portion of the second version, the portion of first version is presented in a different manner than the corresponding portion of the second version, or interaction with the portion of the first version causes a different action than interaction with the corresponding portion of the second version;
      determining a number of exposures to the network resource occurring during a subsequent period of time following the initial period of time;
      determining an expected effect that the difference between the first version and the second version is likely to have on the metric during the subsequent period of time, wherein the expected effect is determined based at least in part on the initial effect and the number of exposures;

determining an observed effect that the difference between the first version and the second version has on the metric during the subsequent period of time, wherein the observed effect is determined based at least in part on data regarding actions performed during the subsequent period of time, and wherein an action performed by an individual user of the network resource during the subsequent period of time is performed after a user device of the individual user receives either the first version or the second version;

determining to modify the network resource based at least in part on a degree the observed effect differs from the expected effect; and modifying the network resource.

2. The computer-implemented method of claim 1, wherein the network resource comprises at least one of an audio presentation, a visual presentation, or a tactile presentation.

3. The computer-implemented method of claim 1, further comprising receiving data regarding actions performed after exposure to the network resource during the initial period of time, wherein an action performed by a first user during the initial period of time is performed after a first user device of the first user receives the first version, and wherein an action performed by a second user during the initial period of time is performed after a second user device of the second user receives the second version.

4. The computer-implemented method of claim 1, wherein the metric relates to at least one of: selections of a portion of the first version or the second version; transactions initiated using the network resource; or actions performed after receiving the network resource.

5. The computer-implemented method of claim 1, further comprising:

determining a second expected effect that the difference between the first version and the second version is likely to have on a second metric during the subsequent period of time; and determining a second observed effect that the difference between the first version and the second version has on the second metric during the subsequent period of time, wherein determining to modify the network resource is further based at least in part on a degree to which the second observed effect differs from the second expected effect.

6. The computer-implemented method of claim 1, further comprising determining a rate at which a difference between the observed effect and the expected effect changes over the subsequent period of time.

7. A non-transitory computer storage medium storing executable code, wherein the executable code configures a computing system to perform a process comprising:

determining an initial effect that a difference between a first version of a network resource and a second version of the network resource has on a metric during an initial period of time, wherein the metric relates to actions performed after accessing the network resource, and wherein the difference comprises at least one of: a portion of the first version is generated using a different algorithm than a corresponding portion of the second version, the portion of first version is presented in a different manner than the corresponding portion of the second version, or interaction with the portion of the first version causes a different action than interaction with the corresponding portion of the second version;

determining a number of exposures to the network resource occurring during a subsequent period of time following the initial period of time;

determining an expected effect that the difference between the first version and the second version is likely to have on the metric during the subsequent period of time, wherein the expected effect is determined based at least in part on the initial effect and the number of exposures;

determining an observed effect that the difference between the first version and the second version has on the metric during the subsequent period of time, wherein the observed effect is determined based at least in part on data regarding actions performed during the subsequent period of time, and wherein an action performed by an individual user of the network resource during the subsequent period of time is performed after a user device of the individual user receives either the first version or the second version;

determining to modify the network resource based at least in part on a degree the observed effect differs from the expected effect; and modifying the network resource.

8. The non-transitory computer storage medium of claim 7, wherein the network resource comprises at least one of an audio presentation, a visual presentation, or a tactile presentation.

9. The non-transitory computer storage medium of claim 7, wherein the metric relates to at least one of: selections of a portion of the first version or the second version; transactions initiated using the network resource; or actions performed after receiving the network resource.

10. The non-transitory computer storage medium of claim 7, wherein the process further comprises:

determining a second expected effect that the difference between the first version and the second version is likely to have on a second metric during the subsequent period of time; and determining a second observed effect that the difference between the first version and the second version has on the second metric during the subsequent period of time, wherein determining to modify the network resource is further based at least in part on a degree the second observed effect differs from the second expected effect.

11. The non-transitory computer storage medium of claim 7, wherein the process further comprises determining a rate at which a difference between the observed effect and the expected effect changes over the subsequent period of time, wherein determining to modify the network resource is further based at least partly on the rate.

12. A system comprising:

computer-readable memory storing executable instructions; and one or more processors in communication with the computer-readable memory and configured by the executable instructions to at least:

determine an initial effect that a difference between a first version of a network resource and a second version of the network resource has on a metric during an initial period of time, wherein the metric relates to actions performed after accessing the network resource, and wherein the difference comprises at least one of: a portion of the first version is generated using a different algorithm than a corresponding portion of the second version, the portion of first version is presented in a different manner than the corresponding portion of the second version, or interaction with the portion of the first version causes a different action than interaction with the corresponding portion of the second version;

determine a number of exposures to the network resource occurring during a subsequent period of time following the initial period of time;

determine an expected effect that the difference between the first version and the second version is likely to have on the metric during the subsequent period of time, wherein the expected effect is determined based at least in part on the initial effect and the number of exposures;

determine an observed effect that the difference between the first version and the second version has on the metric during the subsequent period of time, wherein the observed effect is determined based at least in part on data regarding actions performed during the subsequent period of time, and wherein an action performed by an individual user of the network resource during the subsequent period of time is performed after a user device of the individual user receives either the first version or the second version;

determine to modify the network resource based at least in part on a degree the observed effect differs from the expected effect; and modify the network resource.

13. The system of claim 12, wherein the network resource comprises at least one of an audio presentation, a visual presentation, or a tactile presentation.

14. The system of claim 12, wherein the one or more processors are further configured to receive data regarding actions performed after exposure to the network resource during the initial period of time, wherein an action performed by a first user during the initial period of time is performed after a first user device of the first user receives the first version, and wherein an action performed by a second user during the initial period of time is performed after a second user device of the second user receives the second version.

15. The system of claim 12, wherein the metric relates to at least one of: selections of a portion of the first version or the second version; transactions initiated using the network resource; or actions performed after receiving the network resource.

16. The system of claim 12, wherein the one or more processors are further configured to:

determine a second expected effect that the difference between the first version and the second version is likely to have on a second metric during the subsequent period of time; and determine a second observed effect that the difference between the first version and the second version has on the second metric during the subsequent period of time, wherein determining to modify the network resource is further based at least in part on a degree the second observed effect differs from the second expected effect.

17. The system of claim 12, wherein the one or more processors are further configured to determine a rate at which a difference between the observed effect and the expected effect changes over the subsequent period of time.

18. The system of claim 17, wherein the one or more processors are configured to execute the executable instructions to determine to modify the network resource based at least partly on the rate.

19. The system of claim 12, wherein the one or more processors are configured to execute the executable instructions to modify the network resource by implementing an algorithm associated with the second version.

20. The system of claim 12, wherein the one or more processors are configured to execute the executable instructions to modify the network resource by implementing a presentation change associated with the second version.

* * * * *